Sept. 17, 1968 C. A. O'BRIEN 3,401,696
SEMEN COLLECTION FUNNEL
Filed Oct. 4, 1965 2 Sheets-Sheet 1
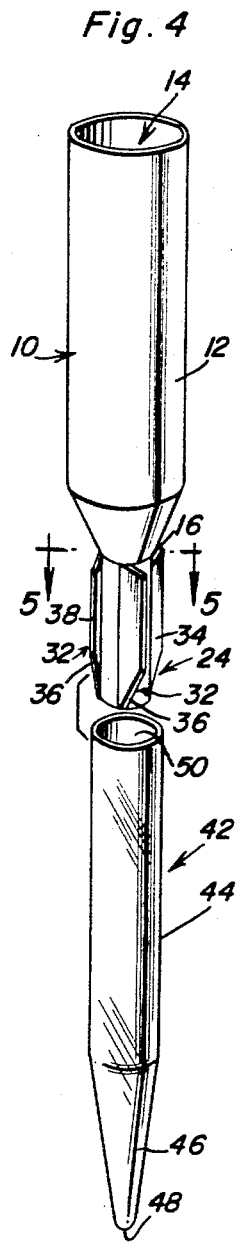
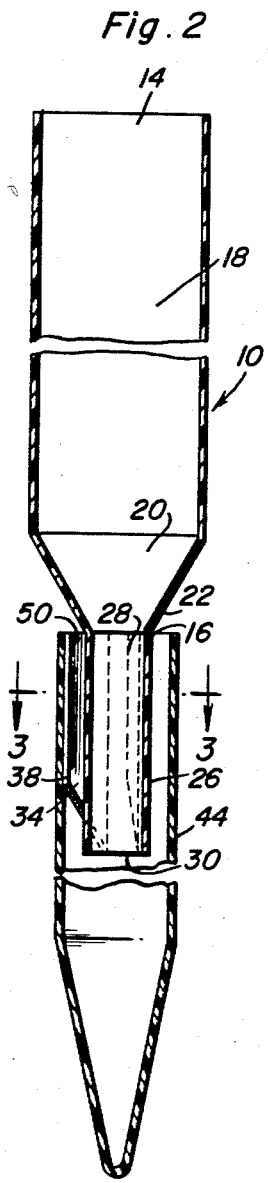
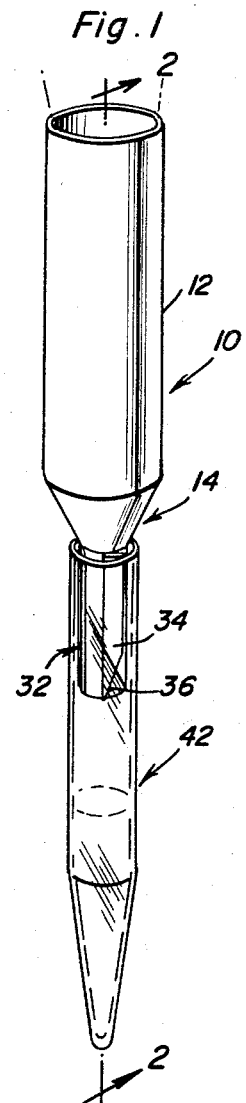
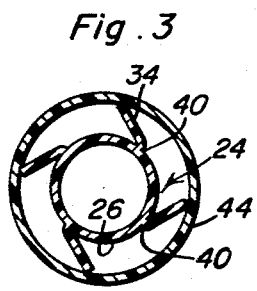
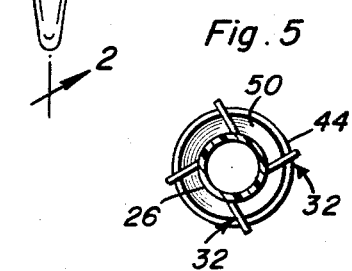
Coleman A. O'Brien
INVENTOR.

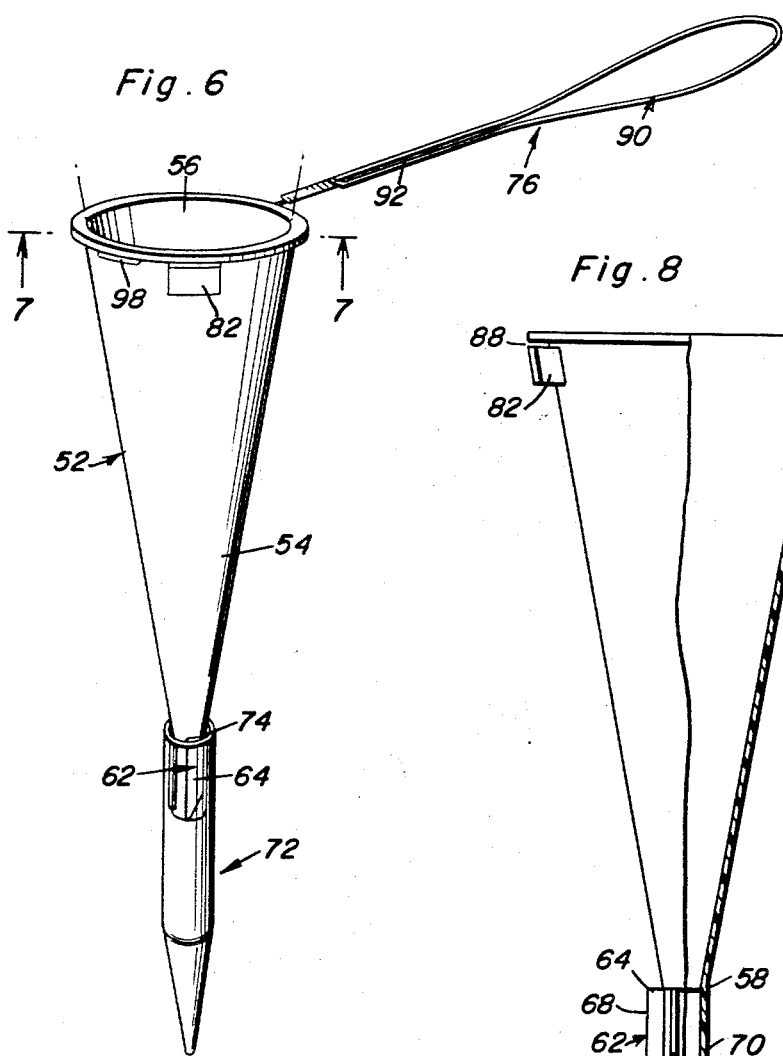

United States Patent Office 3,401,696
Patented Sept. 17, 1968

3,401,696
SEMEN COLLECTION FUNNEL
Coleman A. O'Brien, 3805 26th St.,
Lubbock, Tex. 79410
Filed Oct. 4, 1965, Ser. No. 492,665
10 Claims. (Cl. 128—294)

ABSTRACT OF THE DISCLOSURE

A funnel used in combination with a semen collecting and storage vial having a neck section telescoped into the vial and frictionally retained therein by the provision of a plurality of flexible fins on the neck section which are disposed at an angle from an extended radius and depressed inwardly by the rigid inner surface of the vial for frictionally and releasably retaining the collecting funnel and vial in assembled condition. The collecting funnel may be cylindrical or frusto-conical in configuration. A handle structure is releasably attached to the frusto-conical funnel to enable it to be easily held in position for use.

---

This invention relates generally to a device useful for determining the fertility of male animals and more particularly to a collection device for collecting semen from male animals.

Use of fertility testing equipment has gained widespread use among breeders and producers of cattle, sheep, goats, and other domestic animals. The reason for such testing is the great expense incurred by atempting to mate male animals which are either infertile or of low fertility. Such animals require feeding, investment and care equal to fertile sires, while as may be expected, do not produce the same results.

The original manner of fertility testing of prospective sires was by visual inspection. However, this method proved to be quite ineffective. Inasmuch as statistics have shown that up to 16% of certain groups of male animals were at least partially infertile, more effective means for determining fertility was required. Accordingly, various electrical-ejaculation devices to cause the erection of the male animal penis and ejaculation of semen have been developed. These devices utilize ejaculator electrical probes which are normally inserted into the animal at which time rhythmically applied voltages cause erection and ultimate ejaculation of semen by the animal.

In the past, semen collection vials have been used to collect the animal semen during the electrical-ejaculation process, the vials of necessity being sufficiently large to accommodate the penis of the largest animals. However, the use of such large vials has proved to be unwieldy and cumbersome as well as causing the waste of collected semen due to undue exposure of the semen or loss due to the extreme size of the large vials with respect to the amount of semen collected. The normal amount of semen collected from a ram, for example, is approximately 1 milliliter. The aforementioned large collection vials used in the prior art are conventionally 30–50 milliliters in volume. Hence, it is apparent that semen will be lost or wasted when the contents of the large vial is poured into a smaller (15 milliliters) storage vial. On the other hand, if the large vial itself is stored, the space requirements during a field operation will limit the number of collections that could be made at one time.

While crude funnels for use in conveying the ejaculated semen to the smaller (15 milliliters) storage vials have been used in order to attempt to obviate the objectionable features of the large vials, such funnels have also proved to be unsatisfactory due to the lack of a means for quickly and securely joining the funnel to the small storage vials.

Accordingly, it is an object of the present invention to provide means for use with electro-ejaculation apparatus for collecting the semen ejaculated by various male animals.

It is another object of the present invention to provide a novel collection funnel for use with electro-ejaculation apparatus for conveying the semen ejaculated by the male animal to small collection or storage vials.

It is a further object of the present invention to provide a novel collection funnel for use with rams, male goats or smaller male animals in order to convey ejaculated semen to small storage vials.

It is a still further object of the present invention to provide a novel collection funnel for use with bulls in order to convey ejaculated semen to small storage vials.

It is another object of the present invention provide novel funnels for use with electro-ejaculation apparatus including means thereon for releasable attachment directly to small storage vials.

It is another object of the present invention to provide semen collection means which allows one operator to collect semen from a large number of male animals while in the field.

It is a further object of the present invention to provide semen collection means which allows one operator to collect semen from a large number of animals while in the field.

It is a still further object of the present invention to provide two types of semen collection funnels having flexible coupling vanes thereon for quick coupling to and release from semen storage vials, each of which utililes a frictional coupling means.

It is a still further object of the present invention to provide means allowing for collection of semen from male animals directly into standard 12–15 milliliter calibrated collection vials.

It is a final object of the present invention to provide an easily fabricated, sturdy funnel sufficiently large to receive a male animal's penis during collection of semen.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the collection funnel of the present invention in operative connection with a conventional small semen storage vial;

FIGURE 2 is an enlarged vertical sectional view taken substantially on the plane of the line 2—2 of FIGURE 1;

FIGURE 3 is a still further enlarged horizontal sectional view taken substantially on the plane of the line 3—3 of FIGURE 2;

FIGURE 4 is a perspective view similar to that of FIGURE 1 illustrating the collection funnel and storage vial in unconnected position;

FIGURE 5 is a horizontal view partially in cross section and partially in plan taken substantially on the plane of the line 5—5 of FIGURE 4;

FIGURE 6 is a perspective view of a second embodiment of collection funnel comprising the present invention in operative connection with a small storage vial;

FIGURE 7 is a horizontal sectional view taken substantially on the plane of the line 7—7 of FIGURE 6; and FIGURE 8 is an enlarged view partially in side elevation and partially in section of the collection funnel illustrated in FIGURES 6 and 7.

Referring now to the drawings with more particularity and especially to FIGURES 1–5, reference numeral 10 generally denotes the first form of collection funnel comprising the present invention. The collection funnel 10 is useful with rams or male goats and includes a cylindrical body 12 having an animal penis receiving opening 14 in the upper end thereof, the cylindrical body 12 being hollow throughout its length. The cylindrical body 12 is preferably fabricated of a substantially rigid plastic or glass material as is the inwardly tapered intermediate section 14 which is integrally formed with the cylindrical body 12. The intermediate section 14 tapers downwardly to a point denoted by reference numeral 16, at which point the transverse cross-sectional area of the intermediate section is at a minimum. The body 12 includes a penis receiving cavity 18 therein and the intermediate section 14 includes a semen directing chamber 20 therein formed by the tapered side wall 22 of section 14, the side wall 22 forming the funnel-shaped semen directing chamber 20.

Integrally formed at the lower end 16 of intermediate section 14 and constructed of the same plastic or glass substantially rigid material is a fin-bearing neck section 24. The neck section 24 includes a cylindrical wall 26 having an internal diameter equal to the diameter at point 16 of intermediate section 14. A semen directing elongate chamber 28 is formed by wall 26, the chamber 28 having an opening 30 at the lower end thereof.

The fin-bearing neck section 24 includes a plurality of fins generally denoted by reference numeral 32 thereon, the fins 32 being integrally formed about the outer peripheral surface of wall 26. It is anticipated that four fins 32 will be sufficient for the intended purpose, however, as will be appreciated, a greater or lesser number of fins may be utilized if desired. The fins 32 are preferably integrally molded on the wall 26 and extend longitudinally therealong. The fins 32 include a substantially rigid body portion 34 having an inwardly tapered edge portion 36 and an edge portion 38 which is substantially parallel to the wall 26. The body portion 34 of fins 32 is joined to the wall 26 along the line indicated by reference numeral 40 and the fins 32 are normally positioned at an angle of approximately 30° to the joining line 40 on wall 26. Further, the connection of fins 32 to the wall 26 along the line 40 is a flexible connection due to the type of plastic material of which the wall 26 and fins are constructed, thereby allowing the angle between the fins 32 and the wall 26 to vary as the fins 32 are flexed either toward or away from the wall 26. Thus, it will be appreciated that the animal's penis is positioned in the penis receiving cavity 18 of body 12 upon erection, and upon ejaculation of the animal by conventional electro-ejaculation apparatus, the semen will be directed into the semen directing chamber 20 and thence into the semen directing chamber 28 and outwardly through opening 30 in the end of fin-bearing section 24.

In order to collect the semen from the collection funnel 10 for storage thereof, a conventional storage vial 42, preferably of the 12 to 15 milliliter size, and normally having calibrations thereon, will be positioned on the fin-bearing neck section 24 of collection funnel 10 as illustrated in FIGURES 1 and 2. The storage vial 42 has a substantially cylindrical hollow loop portion 44 and a tapered portion 46 with the end 48 of tapered portion 46 being closed. The upper end 50 of cylindrical portion 44 is open and is normally of an internal diameter slightly less than the extensions of fins 32 when they are in their normal unflexed angularly offset position on the wall 26. Thus, it will be appreciated that the forward portion on the tapered edges 36 of the fins 32 comprise, in combination, an outer diameter which is less than the inner diameter of cylindrical section 44, while the longitudinal edges 38 of the fins 32 comprise an outer diameter which is greater than the inner diameter of cylindrical section 44. However, due to the taper of the edges 36, and further, due to the flexibility of fins 32 on wall 26, the fin-bearing neck section 24 of collection funnel 10 may be forced downwardly in the cylindrical section 44 as best shown in FIGURES 1 and 2. When the storage vial 42 and the collection funnel 10 are mated, as when the fin-bearing neck section 24 is forced into the open end 50 of cylindrical section 44 of the storage vial, the tapered edges 36 of fins 32 will first contact the internal surface of the cylindrical section 44. After the edges 36 contact the internal surface of cylindrical section 44 it will take some predetermined amount of force to push the storage vial upwardly over the neck section 24, at which time the fins 32 will be forced toward the wall 26 of neck section 24, thus decreasing the angle between the fins 32 and the wall 26. At the time the neck section 24 is fully positioned within the storage vial 42, as for example shown in FIGURES 1 and 2, there will exist a friction fit between the collection funnel 10 and storage vial 42, as the fins 32 will resist the inward flexation imparted by forcing the neck section 24 into the vial and thus exert outward force against the inner surface of cylindrical section 44. Thus, it will be apparent that the storage vial 42 will be releasably held on the neck section 24 and the semen which will flow outwardly through opening 30 may be collected in the storage vial 42. Of course, when the collection of semen is completed, the storage vial 42 may be easily pulled from the neck section 24 and quickly closed in order to preserve the semen and protect it from air and light. It is anticipated that the collection funnel 10 will be held in the operator's hand over the animal's penis until the electro-ejaculation process is completed, however, as the storage vial 42 is relatively light of weight and nonflexible, the operator need not hold the storage vial during the operation.

It is anticipated that the approximate dimensions of the collection funnel 10 will be as follows: the body 12—8.5 centimeters in length, the intermediate section 14—1.5 centimeters in length, the neck section 24—3 centimeters in length, and the edge portion 38 of fins 32—2 centimeters in length. Further, the outside diameter of cylindrical body 12 will be approximately 2.8 centimeters, the conventional storage vial 42 will be approximately 12 centimeters in length and 1.7 centimeters in outer diameter. However, as will be appreciated, the dimensions of the collection funnel may be varied to be useful with various sized storage funnels 42.

Referring now to FIGURES 6-8, a modified embodiment of the instant invention is illustrated. In this embodiment, reference numeral 52 generally denotes the collection funnel, the funnel including a frusto-conical body member 54 tapering downwardly from the upper opening 56 to a point 58 of smallest transverse cross-sectional area. Integrally attached to the body member 54 at point 58, and of the same internal diameter as the body member 54 at point 58 is a fin-bearing section 60. The fin-bearing section 60 is substantially similar to the pin-bearing neck section 24 described above and includes a plurality of fins 62 identical to the fins 32 described above. The fins 62 include a fin body 64, a forwardly and inwardly tapered edge portion 66 and edge portion 68 which is parallel to the wall 70 of neck section 62. As will be apparent from viewing FIGURE 6, the collection funnel 52 is readily adapted for use with a conventional semen collection or storage vial 72 identical to the storage vial 42 described above which includes an upper opening 74 therein. Thus, it will be apparent from viewing FIGURE 6 that the storage vial 72 may be positioned over the neck section 62 of collection funnel 52 in order to receive the semen collected from the animal with which the collection funnel 52 is used.

The collection funnel 52 has a frusto-conical body member 54 in order to be used with bulls or other large animals of this sort. Due to the nature of the animals with which the collection funnel 52 is used, a handle such as the handle generally denoted by reference numeral 58 is required in order to hold the collection funnel during the semen collection process. The collection funnel 52 includes a flange 78 integrally formed about the periphery of the upper portion of frusto-conical body member 54 adjacent the opening 56. Also included on the body member 54 adjacent the flange 78 but slightly lower on the body 54 are a pair of locking lugs 80 and 82, which comprise generally rectangular projections from the wall 84 of body 54, integrally formed on the wall 84. The locking lugs 80 and 82 are spaced below the flange 78 leaving the slots 86 and 88 therebetween.

The handle 76 comprises a wire loop holder for the funnel 52 including a handle portion 90, a body portion 92 and a generally circular head portion 94. The head portion 94 of funnel holder or handle 76 is of a diameter slightly less than the outer diameter of flange 78. Therefore, it will be appreciated that the funnel 52 must be positioned downwardly into the head portion 94 of holder 76. The head portion 94 includes a pair of generally rectangular outturned ears 96 and 98 which are shaped to fit over the locking lugs 80 and 82. Further, the thickness of the wire of which the handle 76 is formed, will allow the head portion 94 to fit in the slots 86 and 88 between the locking lugs 80 and 82 and flange 78. Thus, it will be appreciated that the locking lugs 80 and 82 in conjunction with the outturned ears 96 and 98 provide a means of locking the funnel 52 in the handle or holder 76. Thus, the funnel 52 is moved downwardly into the head portion 94 until the locking lugs 80 and 82 are in alignment with the ears 96 and 98, respectively. At this time, the locking lugs 80 and 82 will be moved downwardly through the ears 96 and 98, after which the handle or holder 76 may be turned either clockwise or counter-clockwise, as illustrated in FIGURES 6 and 7 in order to lock the funnel 52 in the head portion 94. At this time, the storage vial 72 may be positioned over the neck section 62 of funnel 52 and, by use of the handle 76, the funnel with attached storage vial is then ready for use in the electro-ejaculation semen collection operation.

It is anticipated that the dimensions of the funnel 52 will be as follows: the outer diameter of flange 78 will be preferably 9 centimeters, the inner diameter of opening 56 will be preferably 7.7 centimeters, the height of locking lugs 80 and 82 will be preferably 1 centimeter, the over-all height of the funnel 52 will be 21 centimeters, the height of the neck section 62 will be 3 centimeters, the lateral dimension of locking lugs 80 and 82 will be 0.5 centimeter and the height of slots 86 and 88 will be 0.3 centimeter. Further, the dimensions of the handle 76 will preferably be as follows: the diameter of the head portion 94 will be 8 centimeters, the depth of ears 96 and 98 will be 0.7 centimeter, and the length of handle and body portions 90 and 92 will be approximately 20 centimeters. However, as will be appreciated the dimensions of the funnel 52 and handle 76 may be varied to be used with various types of animals as well as with different sized storage vials.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collection funnel for use with semen-storage vials comprising a relatively inflexible body member for receiving the reproductive organ of a male animal, said body member having an open receiving end and a discharge end, a neck section positioned at the discharge end to receive semen discharged into said body member, and means for releasably connecting said neck section to a semen storage vial whereby semen discharged into said funnel will be conveyed into the vial, said neck section comprising a generally cylindrical body member, said connecting means comprising frictional engaging means positioned on the outer surface of said cylindrical body member for frictional engagement in a semen-storage vial, said frictional engaging means comprising a plurality of fin means equally spaced about the outer peripheral surface of said cylindrical member, said fin means each connected in angularly extending relationship to said cylindrical member for angular movement relative to said cylindrical member about the point of connection whereby the semen-storage vial may be forced over said neck section in frictional engagement with said fin means.

2. The combination of claim 1 wherein said body member comprises a generally cylindrical elongate body, a tapered section intermediate said cylindrical elongate body and said neck section, the diameter of said cylindrical elongate body being greater than the diameter of said cylindrical body member.

3. The combination of claim 2 wherein said engaging means comprises a plurality of fin means connected in angular engagement to the outer periphery of said cylindrical body member, each of said fin means normally positioned at a first angle with respect to a tangential plane at the line of connection to said cylindrical body member, and each of said fin means being movable to a second angle with respect to a tangential plane at the line of connection to said cylindrical body member as said neck section is moved into a semen-storage vial whereby said vial will be releasably frictionally retained on said neck section.

4. A collection funnel for use with semen-storage vials comprising a relatively inflexible body member for receiving the reproductive organ of a male animal, said body member having an open receiving end and a discharge end, a neck section positioned at the discharge end to receive semen discharged into said body member, and means for releasably connecting said neck section to a semen storage vial whereby semen discharged into said funnel will be conveyed into the vial, said neck section comprising a generally cylindrical body member, said connecting means comprising frictional engaging means positioned on the outer surface of said cylindrical body member for frictional engagement in a semen-storage vial, said body member comprising a generally frusto-conical body, said engaging means comprising a plurality of fin means angularly connected to the outer periphery of said cylindrical body member, each of said fin means normally positioned at a first angle with respect to a tangential plane at the line of connection to said cylindrical body member, and each of said fin means being movable to a second angle with respect to a tangential plane at the line of connection to said cylindrical body member as said neck section is moved into a semen-storage vial whereby said vial will be releasably frictionally retained on said neck section.

5. A collection funnel for use with semen-storage vials comprising a relatively inflexible body member for receiving the reproductive organ of a male animal, said body member having an open receiving end and a discharge end, a neck section positioned at the discharge end to receive semen discharged into said body member, and means for releasably connecting said neck section to a semen storage vial whereby semen discharged into said funnel will be conveyed into the vial, said neck section comprising a generally cylindrical body member, said connecting means comprising frictional engaging means positioned on the outer surface of said cylindrical body member for frictional engagement in a semen-storage vial, said body member comprising a generally frusto-conical body, said engaging means comprising a plurality of fin means angularly connected to the outer periphery of said cylindrical body member, each of said fin means normally positioned at a first angle with respect to a tangential plane at the line of connection to said cylindrical body member, and each of said fin means being movable to a second angle with respect to a tangential plane at the line of connection to said cylindrical body member as said neck section is moved into a semen-storage vial whereby said vial will be releasably frictionally retained on said neck section, and means for holding said collection funnel in collecting position during semen collection, and means for releasably locking said collection funnel in said holding means, said locking means including a flange on said funnel, a plurality of lugs on said funnel in closely spaced relation to said flange, said holding means including a handle having a loop at one end thereof receiving said funnel, said loop having offset recesses therein enabling passage of the lugs on the funnel down therethrough so that the loop may engage the undersurface of the flange on the funnel with the lugs locking the loop to the funnel when twisted into non-alignment with the recesses in the loop.

6. An assembly for collecting semen comprising a collecting and storage vial having a substantially rigid tubular body portion with one end thereof being open, a collecting funnel having a neck section telescopically disposed within the open end of the vial in concentrically spaced relation, said neck section including a plurality of outwardly extending fins of flexible character, said fins being disposed in acute angular relation to an extended radius of the neck section and pivotal generally about the point of connection with the neck section to a greater angular relation to an extended radius thereby frictionally and releasably mounting the funnel and vial in assembled relation, said funnel also including a body portion having a larger cross-sectional area than the neck section for receiving the reproductive organ of a male animal.

7. The combination as defined in claim 6 wherein the funnel includes a tapered section between the neck section and main body portion, said main body portion being of cylindrical configuration.

8. The combination as defined in claim 6 wherein said funnel has a main body portion of substantially frusto-conical configuration.

9. The combination as defined in claim 8 wherein said funnel includes a peripheral flange at the upper end thereof, a handle having a loop encircling the funnel and in underlying engagement to the flange for supporting the assembly, and lugs on said funnel engaging the loop for retaining the loop assembled in relation to the funnel.

10. The combination as defined in claim 9 wherein said loop includes offset portions alignable with the lugs to enable assembly and disassembly of the loop and handle with respect to the funnel.

References Cited

UNITED STATES PATENTS

| | | | |
|---|---|---|---|
| 135,391 | 1/1873 | Way | 141—337 |
| 611,962 | 10/1898 | Hess | 141—365 |
| 947,917 | 2/1910 | Kollenberg | 141—331 |
| 1,522,167 | 1/1925 | Young | 141—331 |
| 2,686,519 | 8/1954 | Westerman | 128—294 |
| 2,771,913 | 11/1956 | Flasnocker | 141—331 |
| 2,902,062 | 9/1959 | Von Smekal | 141—331 |
| 3,201,015 | 8/1965 | Wagaman | 141—332 |
| 3,253,593 | 5/1966 | Cronin | 128—275 |

FOREIGN PATENTS

| | | |
|---|---|---|
| 127,110 | 7/1959 | Russia. |
| 225,964 | 12/1958 | Australia. |
| 1,013,596 | 7/1952 | France. |
| 1,015,041 | 8/1952 | France. |
| 1,164,742 | 3/1964 | Germany. |

CHARLES F. ROSENBAUM, *Primary Examiner.*